United States Patent
Choi et al.

(10) Patent No.: US 6,809,056 B1
(45) Date of Patent: Oct. 26, 2004

(54) PROCESS FOR PREPARING POLYOLEFIN POLYMERIZATION CATALYSTS

(75) Inventors: Hong-Ki Choi, Yeosoo (KR); Joo-Kee Yoon, Yeosoo (KR); Churl-Young Park, Yeosoo (KR); Jae-Seung Oh, Taejeon (KR)

(73) Assignee: LG Chemical Ltd, Seoul (KR)

( * ) Notice: Subject to any disclaimer, the term of this patent is extended or adjusted under 35 U.S.C. 154(b) by 318 days.

(21) Appl. No.: 09/744,929

(22) PCT Filed: Jun. 2, 2000

(86) PCT No.: PCT/KR00/00580

§ 371 (c)(1),
(2), (4) Date: Jan. 31, 2001

(87) PCT Pub. No.: WO00/75197

PCT Pub. Date: Dec. 14, 2000

(30) Foreign Application Priority Data

Jun. 4, 1999 (KR) .......................................... 1999-20656
Feb. 16, 2000 (KR) .......................................... 2000-7342

(51) Int. Cl.[7] .............................................. B01J 31/00
(52) U.S. Cl. ........................ 502/150; 502/102; 502/103; 502/104; 502/115; 502/116; 502/132; 502/151; 502/156; 502/172
(58) Field of Search ................................ 502/150, 102, 502/103, 104, 115, 116, 132, 151, 156, 172

(56) References Cited

U.S. PATENT DOCUMENTS

| | | | | |
|---|---|---|---|---|
| 5,459,116 A | * | 10/1995 | Ro et al. | 502/115 |
| 5,478,890 A | * | 12/1995 | Shinozaki et al. | 525/240 |
| 5,623,033 A | * | 4/1997 | Kioka et al. | 526/124.8 |
| 6,156,690 A | * | 12/2000 | Hosaka | 502/118 |

* cited by examiner

*Primary Examiner*—Mark L. Bell
*Assistant Examiner*—Jennine Brown
(74) *Attorney, Agent, or Firm*—Nixon Peabody LLP

(57) ABSTRACT

The present invention relates to a process for manufacturing polyolefin polymerization catalysts and provides a process for manufacturing polyolefin polymerization catalysts, wherein after manufacturing a homogeneous solution of magnesium compounds using magnesium compounds and alcohols along with hydrocarbon solvents and contacting with titanium compounds by adding organic aluminum, the mixture is treated again with organic aluminum or alcohols having 5 or less carbon atoms, then contacted with titanium compounds. Polyolefin polymerization catalysts prepared by the preparation process of the present invention have superior polyolefin polymerization activities, they prepare polymers having high Melt Flow Ratios, and produce a lesser amount of fine particle polymers.

27 Claims, No Drawings

PROCESS FOR PREPARING POLYOLEFIN POLYMERIZATION CATALYSTS

CROSS REFERENCE TO RELATED APPLICATION

This application is based on application Ser. Nos. 10-1999-0020656 and 10-2000-0007342 filed in the Korean Industrial Property Office on Jun. 4, 1999 and Feb. 16, 2000 respectively, the contents of which are incorporated hereinto by reference.

BACKGROUND OF THE INVENTION (a) Field of the Invention

The present invention relates to a process for preparing polyolefin polymerization catalysts, more particularly to a process for preparing polyolefin polymerization catalysts in which activities are superior during polyolefin polymerization, average particle sizes of polymers to be prepared are large, polymers of undesirable fine particles (particles having diameters of less than 100 $\mu$m) are notably less in amount, and polymers showing a wide range of Melt Flow Ratios from 21.6 kg to 2.16 kg can be prepared.

(b) Description of the Related Art

Sizes of polymers polymerized using Ziegler catalysts are influenced by sizes of generally used catalysts. Technologies controlling sizes and particle distributions of Ziegler catalysts during catalyst preparation are important keys for producing polymers having desirable particle sizes because of this replication phenomena.

During polyolefin polymerization using existing inhomogeneous Ziegler-Natta catalysts which are generally prepared by contacting titanium chloride after pretreating magnesium chloride with ethanol and adding organic aluminum, a method for improving particle shapes of Ziegler polymerization catalysts is to replace catalyst supports, wherein silica and alumina are supports which have frequently been used.

However, these supports have some demerits as follows. First, catalyst preparation expenses are increased when it is necessary to remove catalytic poisons such as moisture which is adsorbed by these supports, by calcinating them at a high temperature. Second, polymer particle sizes can be reduced since supports having large pores are easily broken so fine particles of undesirable catalysts can be produced due to breakage occurring when they are used as catalyst supports. Furthermore, these oxide supports have the demerit of reducing catalyst activities since they have characteristics in which catalytic poisons such as moisture and oxygen are adsorbed very fast.

Furthermore, polymers prepared when polyolefin is polymerized using existing catalysts have many fine particles, and these polymers having many fine particles cause the following problems in operating the polyolefin polymerization processes: the possibility is quite high that small holes made for fluidizing drying equipment can be clogged by the fine particles when polymers obtained from a slurry process are dried by a fluidization bed-type dryer; the transferring capacity is deteriorated when nitrogen gas is blown to transfer the dried polymer particles to a hopper, etc.; and the capability that polymers can be infused to an extruder is reduced in that the extrusion discharge volumes per unit hour are less than when the polymer particle sizes are large.

For these reasons, many technologies controlling catalyst sizes have been published, these technologies frequently consist of various processes for treating supports, and a technology among them in which supports are dissolved into a soluble solvent and recrystallized is disclosed in many literature documents.

When reviewing these technologies, it is found that the simple type of Ziegler catalyst has very low activities and has difficulties controlling polymer shapes even though it is formed by contacting magnesium chloride and titanium chloride. Although there is a process for preparing catalysts by contacting titanium chloride after pretreating magnesium chloride with ethanol and adding organic aluminum compounds such as diethylaluminum chloride, etc. to the mixture in order to complement these demerits, this process has problems in that particle distributions of the produced polymers are not uniform, and undesirable fine particles of less than 100 $\mu$m are present in large quantities when the prepared catalyst activities are high.

Practically, soluble solvents such as alcohol, aldehyde, amine, etc. are frequently used since one of the most frequently used supports, magnesium chloride, has high solubilities on these solvents. When alcohols having 6 or more carbon atoms, particularly octanols among them, are used along with hydrocarbons such as decane, kerosene, hexane, etc., magnesium is completely dissolved at a high temperature of over 100° C. so that magnesium compounds exist in the state of a homogeneous solution which is not reprecipitated even at room temperature. Solid content catalysts can be prepared from these types of homogeneous solution through various treatment processes. Solid state titanium compounds can be obtained most easily by contacting this homogeneous solution with quadrivalence titanium halide compounds such as titanium tetrachloride. This method has merits in that catalysts are easily prepared, activities are superior, polymer specific gravities are very high, and particle distributions are very uniform since solid type catalysts can be formed by lowering a solution temperature or adding nonsolvents so that the recrystallization process can be omitted, and by directly reacting homogeneous solutions of liquid phased magnesium compounds with titanium halide compounds.

Catalysts prepared by the above process are prepared by slowly adding a magnesium homogeneous solution to a titanium tetrachloride compound at a low temperature, for example −20° C. Polymers in which average particle sizes are large and therefore the amount of undesirable fine particles is less, in which catalyst activities are superior, specific gravities are very high, and Melt Flow Ratio values are high, can be prepared. However, average particle sizes of polymers are notably decreased, contents of undesirable fine particles are greatly increased, and specific gravities of polymers are greatly decreased when a magnesium homogeneous solution is added to a titanium tetrachloride compound at a relatively high temperature, like room temperature, when preparing catalysts. Catalysts in which average particle sizes are large, the amount of undesirable fine particles is less, polymer activities and specific gravities are high as in catalysts prepared by adding a magnesium homogeneous solution to a titanium tetrachloride compound at a low temperature can be prepared even at a relatively high temperature, like room temperature, when titanium tetrachloride is slowly added to a magnesium homogeneous solution by changing an order of or adding reactants, thus preparing catalysts in the above preparation process. However, Melt Flow Ratio values of polymers are greatly decreased.

Therefore, catalysts prepared at room temperature can prepare polymers having various particle distributions due to very uniform polymer particle distribution and easy controlling of catalyst particle sizes during catalyst preparation, as well as polymers having a lesser amount of undesirable fine particles. The preparation process of titanium catalysts for polymerizing polyolefin in which polymers having high catalyst activities, specific gravities, and Melt Flow Ratio values (21.4 kg/2.14 kg) is needed in the polyolefin polymerization to which these catalysts are applied.

SUMMARY OF THE INVENTION

It is an object of the present invention to provide a process for preparing polyolefin polymerization catalysts in which polymers having superior olefin polymerization activities, large average particle sizes, notably lesser amounts of undesirable fine particles, and a wide range of Melt Flow Ratio values can be prepared in order to solve the above problems.

Furthermore, it is another object of the present invention to provide a process for preparing titanium catalysts for polyolefin polymerization in which catalyst particles, prepared by contacting a homogeneous solution of magnesium compounds with a quadrivalence titanium halide compound even at a relatively high temperature of over room temperature (25° C.), can prepare polymers having various particle distributions due to the uniform polymer particle distribution and easy controlling of catalyst particle sizes during the catalyst preparation, polymers having a lesser amount of undesirable fine particles, as well as polymers having very high catalyst activities, specific gravities, and Melt Flow Ratio values, taking into account the above conventional technology problems.

DETAILED DESCRIPTION OF THE PREFERRED EMBODIMENTS

In the following detailed description, only the preferred embodiments of the invention have been shown and described, simply by way of illustration of the best mode contemplated by the inventor(s) of carrying out the invention. As will be realized, the invention is capable of modification in various obvious respects, all without departing from the invention. Accordingly, the description is to be regarded as illustrative in nature, and not restrictive.

In order to accomplish the above objects, the present invention provides a process for preparing polyolefin polymerization catalysts comprising the steps of:

a) preparing a homogeneous magnesium solution by heating magnesium compounds, alcohols having 5 or more carbon atoms, and hydrocarbon solvent having 6 or more carbon atoms to a temperature of 110 to 130° C.;

b) preparing magnesium precipitates by then adding an alcohol to the homogeneous solution prepared at the step a);

c) adding a primary organic aluminum compound or alkylmagnesium halide to magnesium precipitates prepared in step b), at a temperature of 25 to 45° C.;

d) adding a titanium compound to magnesium precipitates passed through the step c), at a temperature of 60 to 100° C.;

e) adding secondary organic aluminum compounds or electron donors to magnesium precipitates passed through the step d); and f) filtering, washing, and drying the magnesium precipitate solution passed through the step e).

Furthermore, the present invention provides a process for preparing titanium catalysts for polyolefin polymerization comprising the steps of:

a) preparing a homogeneous solution by agitating:
i) magnesium compounds;
ii) alcohols having 6 or more carbon atoms; and
iii) hydrocarbon solvent;

b) preparing a mixture by adding an alcohol having 5 or less carbon atoms to the homogeneous solution obtained from the step a); and c) contacting a mixture obtained from the step b) with a titanium halide compound.

Furthermore, the present invention provides solid type catalysts for polymerizing polyolefin prepared by the above preparation process.

The present invention is described in detail as follows.

One process for preparing catalysts makes polymers according to the present invention having high polyolefin polymerization activities, large average particle sizes, a notably lesser amount of fine particles, and a wide range of Melt Flow Ratio values. It comprises the steps of adding solvents in which saturated hydrocarbons having 6 or more carbon atoms are used alone or used as a mixture with magnesium compounds and alcohols having from 3 to 10 carbon atoms, and heating to prepare a homogeneous solution. In this case, a homogeneous solution can be prepared since magnesium chloride is easily dissolved at a high temperature when a mixture of alcohols having long alkyl groups such as hexanol, etc. and saturated hydrocarbon solvents such as decane is used.

When methanol, ethanol, n-propanol, isopropanol, n-butanol, tertiary butanol, or a mixture thereof is added to the above prepared homogeneous solution in order, magnesium complexes of a form in which methanol or ethanol, etc., having short alkyl groups are substituted with alcohols having long alkyl groups, such as hexanol and heptanol, etc. are formed since the short alkyl groups have greater coordination powers with magnesium chloride, and these magnesium complexes are more easily precipitated by the solubility difference between the long alkyl group compounds and the short alkyl group compounds.

These magnesium compounds, as non-reductive magnesium compounds, include: magnesium halides such as magnesium chloride, magnesium fluoride, magnesium iodide, etc.; alkoxymagnesium halides such as methoxymagnesium chloride, ethoxymagnesium chloride, etc.; alkoxymagnesiums such as ethoxymagnesium, n-propoxymagnesium, butoxymagnesium, 2-ethylhexosymagnesium, etc.; aryloxymagnesiums such as phenoxymagnesium, etc.; or magnesium carbonate such as magnesium lauric acid, magnesium stearate, etc.; but preferably magnesium halides and alkoxymagnesium halides, and more preferably magnesium chloride and ethoxymagnesium.

The above preparation process is described in detail as follows.

The temperature is increased to between 110 and 130° C., preferably to 120° C., during agitation and after putting 0.5 to 50 g of a magnesium compound, 2.5 to 250 ml of alcohol having 3 to 10 carbon atoms, and 10 to 1,000 ml of saturated hydrocarbons having 6 or more carbon atoms into a flask. After preparing a homogeneous solution by stirring it and maintaining the temperature for about an hour, the solution is cooled to room temperature. After adding 5 to 500 ml of saturated hydrocarbons to the solution and stirring for about 10 minutes, 0.43 to 43 ml of methanol is added and stirred for about 10 minutes. After adding 0.62 to 62 ml of ethanol to this solution and stirring for 24 hours, magnesium complex precipitates [A] are formed.

Furthermore, after the above prepared precipitate [A] solution is heated and stirred while maintaining a temperature of 25 to 45° C., 15.4 to 1,540 ml of one mole concentration of primary organic aluminum compound or alkylmagnesium halide is added to and reacted with this solution for two hours, so that alcohol is removed from the magnesium precipitates. After adding all primary organic aluminum compounds to the solution, stirring further for about one hour, 10 to 1,000 ml of titanium compounds are added for an hour, and the temperature is then increased to between 60 to 100° C., preferably to 80° C., for two hours, during which time solid catalysts are prepared by stirring the solution.

Catalysts are prepared by filtering the above prepared solid catalysts and washing several times with heptane and hexane at 80° C. until titanium compounds are not detected in the solid catalysts, and some parts of the prepared catalysts are taken to analyze the catalyst ingredients. Secondary organic aluminum compounds or electron donors are added to the prepared solid phase catalysts, thereby preparing catalyst ingredients appropriate for polyolefin polymerization in order to improve catalyst activities, selectivities, etc. if necessary.

A compound represented as in the following Chemical Formula 1 or Chemical Formula 2 having one or more aluminum-carbon molecular bond can be used as the above primary organic aluminum compound:

$$R^1{}_m Al(OR^2)_n H_p X_q \qquad \text{Chemical Formula 1}$$

where: $R^1$ and $R^2$, each of which can be the same or different, are hydrocarbon groups having 1 to 10 carbon atoms, preferably hydrocarbon groups having 1 to 4 carbon atoms; X is a halogen atom, $0<m \leq 3$, $0 \leq n<3$, $0 \leq p<3$, $0 \leq q<3$; and $m+n+p+q=3$.

Aluminum compounds of the above Chemical Formula 1 include: trialkylaluminums such as triethylaluminum, tributylaluminum, etc.; trialkenylaluminums such as triisoprenylaluminum, etc.; dialkylaluminumalkoxides such as diethylaluminumethoxide, dibutylaluminumbutoxide, etc.; alkylaluminumsesquialkoxides such as ethylaluminumsesquiethoxide, butylaluminumsesquibutoxide, etc.; partially alkoxyfied alkylaluminums having average compositions represented as in $R^1{}_{2.5}Al(OR^2)_{0.5}$, etc.; dialkylaluminumhalides such as diethylaluminumchloride, dibutylaluminumchloride, diethylaluminumbromide, etc.; alkylaluminumsesquihalides such as ethylaluminumsesquichloride, butylaluminumsesquichloride, ethylaluminumsesquibromide, etc.; partially halogenized alkylaluminums such as ethylaluminumdichloride, propylaluminumdichloride, butylaluminumdibromide, alkylaluminumdihalide, etc.; other partially hydrogenised alkylaluminums or ethylaluminumethoxychlorides such as ethylaluminumdihydride, propylaluminumdihydride, alkylaluminumdihydride, etc.; or partially alkoxyfied and halogenized alkylaluminums such as butylaluminumbutoxychloride, ethylaluminummethoxybromide, etc.

$$M^1 AlR^1{}_4 \qquad \text{Chemical Formula 2}$$

where $M^1$ is Li, Na, or K, and $R^1$ is a hydrocarbon group having 1 to 10 carbon atoms, preferably a hydrocarbon group having 1 to 4 carbon atoms.

$LiAl(C_2H_6)_4$, $LiAl(CH_3)_4$, etc., and preferably trialkylaluminum or dialkylaluminumhalide can be used as a compound of the above Chemical Formula 2.

The above alkylmagnesiumhalide is a compound represented as in the following Chemical Formula 3:

$$RMgX \qquad \text{Chemical Formula 3}$$

where R is a hydrocarbon group having 1 to 10 carbon atoms, and X is a halogen atom. A desirable alkylmagnesium halide is ethylmagnesium chloride or butylmagnesium bromide.

A titanium compound used in preparing the above catalysts is a compound represented as in the following Chemical Formula 4:

$$Ti(OR^1)_a(R^2)_b X_c \qquad \text{Chemical Formula 4}$$

where $R^1$ and $R^2$ are hydrocarbon groups, X is a halogen atom, and $a+b+c=4$, $a \geq 0$, $b \geq 0$, and $c \geq 0$.

Titanium compounds include: titanium tetrahalides such as $TiCl_4$, $TiBr_4$, $TiI_4$, etc.; titanium trihalides such as $Ti(OC_2H_5)Cl_3$, $Ti(OC_2H_5)Br_3$, $Ti(OC_3H_7)Cl_3$, $Ti(OCH_3)C_3$, etc.; titanium dihalides such as $Ti(OC_2H_5)_2Cl_2$, $Ti(OC_2H_5)_2Br_2$, etc.; titanium monohalides such as $Ti(OCH_3)_3Cl$, etc.; and tetraalkoxytitaniums such as $Ti(OCH_3)_4$, $Ti(OC_2H_5)_4$, $Ti(OC_2H_7)_4$, etc.; but preferably halogenized compounds, more preferably tetrahalogenized compounds, and most preferably titanium tetrachloride. These compounds can be diluted in hydrocarbon compounds, halogenized hydrocarbon compounds, etc. before use.

Secondary organic aluminum compounds are the same as the primary organic aluminum compounds, preferably including trialkylaluminum, and more preferably triethylaluminum.

The above used electron donors are compounds represented as in the following Chemical Formula 5, or phthalic anhydride:

$$R^1COOR^2, R^3OOC—C_6H_4—COOR^4 \qquad \text{Chemical Formula 5}$$

where $R^1$ is a hydrocarbon group, and $R^2$, $R^3{}_1$ and $R^4$ are hydrocarbons or hydrogen. Electron donors preferably include $C_6H_5$—COOH, $C_6H_5$—COOC$_2$H$_5$, $C_2H_5$COOH, $C_2H_5$COOC$_2$H$_5$, $C_2H_5$OOC—$C_6H_4$COOCH$_3$, etc.

Catalysts prepared by the above process are used in polyolefin polymerization. Consequently, the catalysts have high activities on polyolefin polymerization, and polymers prepared using the catalysts have large average particle sizes, notably lesser amounts of fine particles, and a wide range of Melt Flow Ratio values.

Furthermore, the present invention provides a process for preparing titanium compounds by contacting a homogeneous solution of magnesium compound with a quadrivalence titanium halide compound, i.e., a process for preparing titanium catalysts for polyolefin polymerization wherein an alcohol having 5 or less carbon atoms is added to a magnesium homogeneous solution, and a magnesium concentration of the mixture and if necessary a temperature of initial contact with titanium halide compounds is controlled so that titanium catalysts are prepared even when contacting magnesium compounds with titanium compounds at a relatively high temperature of more than room temperature (25° C.), and from titanium catalysts polymers can be obtained of which particle sizes are easily controlled, activities are very high, and Melt Flow Ratio values and specific gravities are high.

The catalysts, as solid ingredients formed by contacting a mixture to which one or more alcohols having from 1 to 5 carbon atoms are added with liquid phase quadrivalence titanium halide compounds after preparing a homogeneous solution of magnesium compounds using magnesium compounds and alcohols having 6 or more carbon atoms along with hydrocarbon solvents, comprise the essential ingredients of magnesium, titanium, and halogen.

The magnesium compounds are not reductive, and they include a mixture of two or more: magnesium halides such as magnesium chloride, magnesium bromide, magnesium iodide, etc.; magnesium alkoxyhalides such as magnesium methoxychloride, magnesium ethoxychloride, magnesium isoproxychloride, magnesium butoxychloride, magnesium octoxychloride, etc.; magnesium aryloxyhalides such as magnesium phenoxychloride, etc.; and alkoxymagnesiums such as ethoxymagnesium, isoproxymagnesium, butoxymagnesium, etc.;. Magnesium halides are preferable, and magnesium chloride is particularly preferable among them.

Furthermore, the alcohols having 6 or more carbon atoms include a mixture of two or more of: aliphatic alcohols such as n-hexanol, n-heptanol, n-octanol, decanol, dodecanol, 2-methylpentanol, 2-ethylbutanol, 2-ethylhexanol, etc.; arylcyclic alcohols such as cyclohexanol, methylcyclohexanol, etc.; aromatic alcohols such as benzyl alcohol, methylbenzyl alcohol, isopropylbenzyl alcohol, α-methylbenzyl alcohol, etc.;. Aliphatic alcohols are preferable, and 2-ethylhexyl is particularly preferable among them.

The homogeneous solution of magnesium compounds can be obtained by contacting the magnesium compounds and alcohols having 6 or more carbon atoms with hydrocarbons, wherein the usable hydrocarbons include: aliphatic hydrocarbons such as pentane, hexane, heptane, octane, decane, dodecane, tetradecane, kerosene, etc.; arylcyclic hydrocarbons such as cyclicpentane, cyclichexane, cyclicoctane, methylcyclicpentane, methylcyclic hexane, etc.; aromatic hydrocarbons such as benzene, toluene, xylene, ethylbenzene, cumene, etc.; and hydrocarbon halides such as dichloroethane, dichloropentane, trichloroethane, carbon tetrachloride, chlorobenzene, etc. Aliphatic hydrocarbons are preferable, and hexane, heptane, and decane are more preferable among them. Although alcohols having 5 or less carbon atoms can be used instead, they are fully dissolved when the mole ratio is about 15:1 alcohol to magnesium compounds. However, alcohol precipitates of magnesium compounds can be formed at room temperature when the mole ratio is less that 15:1 alcohol to magnesium compounds.

A homogeneous solution of magnesium compounds can be formed by simply mixing and agitating magnesium compounds, alcohols having 6 or more carbon atoms, and saturated hydrocarbons. However, heating is not greatly helpful in dissolving magnesium compounds. A solution temperature of 100 to 150° C. is preferably used. 0.5 to 10 moles, and preferably 1.5 to 5 moles of an alcohol having 6 or more carbon atoms per one mole of magnesium compound can be used. Although dissolution of magnesium compounds is different depending on the magnesium compounds used, types and mole ratios of alcohols and hydrocarbons, generally the higher the mole ratios of alcohols and solution temperatures, the easier the dissolution. Additionally adding the alcohols or raising the temperatures further can be helpful in dissolving magnesium compounds when magnesium compounds are not fully dissolved.

Next, a mixture is formed by adding one or more alcohols having 5 or less carbon atoms to a homogeneous solution of the magnesium compounds, wherein 0.5 to 6 moles, and preferably 0.5 to 3 moles of an alcohol having 5 or less carbon atoms per mole of magnesium compound are used. Examples of these alcohols having 5 or less carbon atoms include methanol, ethanol, isopropanol, n-butanol, tert-butanol, n-pentanol, etc., and precipitates of magnesium compounds can be formed when mole ratios of methanol, ethanol, etc. are high. Among the alcohols having 5 or less carbon atoms, ethanol is preferable from among the above examples, and ethanol and methanol together are more preferable.

Catalysts of the present invention are formed by contacting quadrivalence titanium halide compounds represented as in the following Chemical Formula 6 with the above-formed mixture:

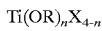

Chemical Formula 6 where R is a hydrocarbon, n is an integer within the range of 0≦n<4, and X is a halogen.

Concrete examples of these titanium halide compounds include: titanium tetrahalides such as $TiCl_4$, $TiBr_4$, and $TiI_4$; alkoxytitanium trihalides such as $Ti(OCH_3)Cl_3$, $Ti(OC_2H_5)Cl_3$, $Ti(OC_2H_5)Br_3$, etc.; alkoxytitanium dihalides such as $Ti(OCH_3)_2Cl_2$, $Ti(OC_2H_5)_2Cl_2$, $Ti(OC_2H_5)_2Br_2$, etc.; alkoxytrititanium halides such as $Ti(OCH_3)_3Cl$, $Ti(OC_2H_5)_3Cl$, and $Ti(OC_2H_5)_3Br$. Titanium tetrahalides are preferable, and titanium tetrachloride is particularly preferable among them.

When a mixture that is formed by adding alcohols having 5 or less carbon atoms to a homogeneous solution of magnesium compounds is contacted with titanium halide compounds, the average particle size of catalysts are much greater than those of catalysts in which alcohols having 5 or less carbon atoms are not added to a homogeneous solution of magnesium compounds, but still contacted with titanium halide compounds. That is, the addition of alcohols having 5 or less carbon atoms before the reaction of a homogeneous solution and titanium compounds has the effect of increasing average particle sizes of the finally prepared catalysts. Average particle sizes are greatly increased and fine particles of below 100 μm are notably decreased, particularly when a mixture of ethanol and methanol is used.

A reaction temperature of a homogeneous solution or mixture of the magnesium compounds and titanium halide compounds is from −50 to 100° C., preferably from −20 to 80° C., and more preferably from 10 to 50° C. This is the reaction temperature of an initial homogeneous solution or mixture and titanium halide compounds, wherein the reaction is carried out in a way whereby a homogeneous solution or mixture is agitated in a reactor and a certain amount of titanium halide compounds are added little by little for a certain period of time, and a slurry type compound can be post-treated by adding heat or another form of titanium compound to it after the reaction.

The magnesium concentration of a homogeneous solution or mixture along with the reaction temperature of the titanium halide compound influences the catalyst average sizes, wherein a magnesium concentration of 5 to 100 g/l, preferably 10 to 50 g/l, is used. Catalyst concentration can be controlled by the amount of hydrocarbon solvent used when magnesium compounds are dissolved into the solvent, and there is a tendency that as the magnesium compound concentration of a homogeneous solution or mixture increases, the average catalyst particle size decreases.

The present invention is described further in detail through the following EXAMPLES and COMPARATIVE EXAMPLES. However, EXAMPLES are only for illustrating the present invention and the present invention is not limited to the following EXAMPLES.

EXAMPLES

EXAMPLES and COMPARATIVE EXAMPLES for the first process of the present invention are as follows:

Example 1
(Preparation of Precipitates [A1])

After putting a magnetic bar into a 500 ml round flask and sufficiently substituting with nitrogen, 100 ml of decane, 5 g of magnesium dichloride, and 25 ml of 2-ethylhexylalcohol were put into the flask and the temperature was increased to 120° C. while stirring. The temperature was maintained at 120° C. and the mixture was stirred for about an hour until it became a homogeneous solution. After all magnesiums were dissolved and the homogeneous solution temperature was cooled to room temperature, an additional 50 ml of decane were added to the solution, and it was stirred for about 10 minutes. After adding 4.3 ml of methanol to the magnesium homogeneous solution and stirring it for 10 minutes, 6.2 ml of ethanol were added and the mixture was stirred for 24 hours, thereby obtaining white precipitates.

(Preparation of Catalysts [B1])

154 ml of 1 mole concentrated diethylaluminum chloride were added to the above prepared white precipitate [A1] solution over 2 hours, while stirring and maintaining a temperature of 25 to 40° C. After adding all the diethylaluminum chloride, stirring for an additional hour and adding 100 ml of titanium tetrachloride over the hour, the temperature was increased to 80° C. and the solution was stirred for 2 additional hours, thus preparing solid catalysts. The prepared solid parts were heat-filtered and washed several times with heptane and hexane at 80° C. until titanium tetrachloride was no longer detected, and the prepared solid phase titanium catalyst constituents were then obtained as a hexane slurry. A part of these catalysts was taken, dried, and analyzed. The resulting catalyst composition was found to comprise 2.5 wt % of titanium, 51.0 wt % of chlorine, and 14.9 wt % of magnesium.

(Polymerization 1)

After sufficiently substituting 2 l of a stainless steel autoclave reactor with nitrogen, putting 1 l of refined hexane into it, and heating to 80° C., 4 mmol of triethylaluminum and then 0.02 mmol of the above prepared catalysts were added to it. The reactor was pressurized using hydrogen so as to make the total pressure 45 psi. The polymerization was carried out at the temperature of 80° C. for two hours while adding ethylene so that a total pressure of 128 psi could be maintained. After performing the polymerization, filtering the polymers with a filter and washing with methanol, polymers were reduced pressure dried at 80° C. for 4 hours.

Example 2

(Preparation of Precipitates [A2])

After putting a magnetic bar into a 500 ml round flask and sufficiently substituting with nitrogen, 100 ml of decane, 5 g of magnesium dichloride, and 25 ml of 2-ethylhexylalcohol were put into the flask and the temperature was increased to 120° C. while stirring. The temperature was maintained at 120° C. and the mixture was stirred for about an hour until it became a homogeneous solution. After all magnesiums were dissolved and the homogeneous solution was cooled to room temperature, an additional 50 ml of decane were added to the solution and it was stirred for about 10 minutes. After adding 3.2 ml of methanol to the magnesium homogeneous solution and stirring it for 10 minutes, 9.9 ml of ethanol were added and the mixture was stirred for 24 hours, thereby obtaining white precipitates.

(Preparation of Catalysts [B2])

66 ml of 1 mole concentrated triethylaluminum chloride were added over 2 hours while maintaining a temperature of the above prepared white precipitate [A2] solution at 25 to 40° C. and stirring. After adding all the triethylaluminum, stirring for an additional hour and adding 100 ml of titanium tetrachloride over the hour, the temperature was increased to 80° C. and the solution was stirred for 2 hours, thus preparing solid catalysts. The prepared solid parts were heat-filtered and washed several times with heptane and hexane at 80° C. until titanium tetrachloride was no longer detected, and the prepared solid phase titanium catalyst constituents were then obtained as a hexane slurry. A part of these catalysts was taken, dried, and analyzed. The resulting catalyst composition was found to comprise 3.6 wt % of titanium, 58.0 wt % of chlorine, and 15.0 wt % of magnesium.

(Polymerization 2)

The polymerization was performed in the same process as the polymerization 1 of EXAMPLE 1.

Comparative Example 1

(Preparation of Precipitates [A3])

After putting a magnetic bar into a 500 ml round flask and sufficiently substituting with nitrogen, 100 ml of decane, 5 g of magnesium dichloride, and 25 ml of 2-ethylhexylalcohol were put into the flask and the temperature was increased to 120° C. while stirring. The mixture was then stirred while maintaining the temperature at 120° C. for about an hour until it became a homogeneous solution. After all magnesiums were dissolved and the homogeneous solution was cooled to room temperature, an additional 50 ml of decane were added to the solution and the solution temperature was maintained at 10° C. After adding 12 ml of ethanol to the magnesium homogeneous solution over 30 minutes and additionally stirring it for 30 minutes, white magnesium precipitates were obtained (Preparation of Catalysts [B3])

50 ml of 1 mole concentrated diethylaluminum chloride were added to the above prepared white magnesium precipitate [A3] solution over two hours, while stirring and maintaining a temperature of 10° C. After adding all the diethylaluminum chloride, stirring for an additional hour and adding 100 ml of titanium tetrachloride over the hour, the temperature was increased to 80° C. and the solution was stirred for 2 hours, thereby preparing solid catalysts. The prepared solid parts were heat-filtered and washed several times with heptane and hexane at 80° C. until titanium tetrachloride was no longer detected. The prepared solid parts were taken and along with 100 ml of decane put into a 500 ml of round flask sufficiently substituted with nitrogen, then stirred. After adding 50 ml of titanium tetrachloride to this over one hour and increasing the temperature to 130° C., the mixture was stirred for 4 hours, thereby preparing solid catalysts. The prepared solid parts were heat-filtered and washed several times with heptane and hexane at 80° C. until titanium tetrachloride was no longer detected, and the prepared solid phase titanium catalyst constituents were then obtained as a hexane slurry. A part of these catalysts was taken, dried, and analyzed. The resulting catalyst composition was found to comprise 4.7 wt % of titanium, 64.0 wt % of chlorine, and 15.0 wt % of magnesium.

(Polymerization 3)

The polymerization was performed in the same process as the polymerization 1 of EXAMPLE 1.

Comparative Example 2

(Preparation of Catalysts [B4])

After putting a magnetic bar into a 500 ml round flask and sufficiently substituting with nitrogen, 5.1 g of magnesium dichloride and 194 ml of decane were put into the flask and 18.8 ml of ethanol were added to it over 10 minutes, while stirring. After that, the mixture was cooled to room temperature and it was stirred for an additional hour. After adding a solution in which 17.5 ml of diethylaluminum chloride was diluted in 20 ml of decane to the flask over an hour while maintaining a temperature inside the flask at 35 to 40° C., the solution was stirred for an additional hour. After adding 70.6 ml of titanium chloride to this solution over 30 minutes and increasing the temperature to 80° C., it was stirred for 2 hours. The produced solid was heat-filtered and washed several times with heptane or hexane at 80° C. until titanium tetrachloride was no longer detected. The above-prepared solid phase titanium catalyst constituents were then obtained as a hexane slurry. A part of these catalysts was taken, dried, and analyzed. The resulting catalyst composition was found to comprise 4.7 wt % of titanium, 58.0 wt % of chloride, and 14.0 wt % of magnesium.

(Polymerization 4)

The polymerization was performed in the same process as the polymerization 1 of EXAMPLE 1.

The polymerization conditions are represented in the following Table 1.

TABLE 1 polymerization conditions

| Polymerization temperature | Hydrogen | Reaction time | Ethylene | Amount of triethyl-aluminum | Amount of catalysts |
|---|---|---|---|---|---|
| 80° C. | 45 psi | 1 hr | 128 psi | 4 mmol | 0.02 mmol |

The pressures in the above Table 1 represent gauge pressures, wherein after applying the pressure of 45 psi at 80° C., shown as hydrogen pressure, and closing the valve, the pressure was increased to 128 psi, shown as ethylene pressure.

The polymerization results are represented in the following Table 2.

TABLE 2 polymerization results

| Classification | Yield (g) | $MI_5$ (g/10 min)[1] | Fine particle sizes less than 106 μm | MFR (21.6 kg/2.16 kg)[2] |
|---|---|---|---|---|
| EXAMPLE 1 | 178 | 9.95 | 13.5 | 37.9 |
| EXAMPLE 2 | 167 | 6.62 | 13.3 | 35.7 |
| COMPARATIVE EXAMPLE 1 | 164 | 4.45 | 25.0 | 32.6 |
| COMPARATIVE EXAMPLE 2 | 165 | 5.78 | 57.7 | 35.0 |

$MI_5$ (g/10 min)[1]: Melt Index (amount of polymer flowed from the weight of 5 kg at 190° C. for 10 minutes)

MFR (21.6 kg/2.16 kg)[2]: Melt Flow Ratio (ratio of polymer amount flowed from the weight of 21.6 kg and polymer amount flowed from the weight of 2.16 kg at 190° C. for 10 minutes)

The distributions per particle sizes are represented in the following Table 3.

TABLE 3 distributions per particle sizes

| Mesh sizes (μm) | EXAMPLE 1 (%) | EXAMPLE 2 (%) | COMPARATIVE EXAMPLE 1 (%) | COMPARATIVE EXAMPLE 2 (%) |
|---|---|---|---|---|
| Over 500 | 14.5 | 12.4 | 3.3 | 2.5 |
| 500–300 | 22.4 | 28.4 | 10.1 | 7.1 |
| 300–212 | 23.8 | 22.1 | 27.8 | 8.5 |
| 212–150 | 13.9 | 11.6 | 23.8 | 8.4 |
| 150–106 | 11.8 | 12.2 | 11.6 | 15.8 |
| 106–75 | 5.8 | 6.4 | 6.5 | 20.0 |
| 75–53 | 4.9 | 5.0 | 8.3 | 22.2 |
| 53–0 | 2.8 | 1.9 | 8.6 | 15.5 |
| Average particle sizes (μm) | 252 | 264 | 189 | 94 |

The polymer yields were more superior, melt flow ratios of the prepared polymers were higher, and polymers having undesirable fine particles were fewer when polymerization catalysts were used than when existing ethylene polymerization catalysts were used in the ethylene polymerization.

EXAMPLES and COMPARATIVE EXAMPLES regarding the second process of the present invention are as follows:

Example 3

(Catalyst Preparation)

12.5 g of anhydride magnesium dichloride, 64.5 ml of 2-ethylhexylalcohol, and 300 ml of hexane were put into an anti-pressure glass reactor substituted with a sufficient amount of nitrogen and stirred at 120° C. for 3 hours. When magnesium compounds were fully dissolved so the solution became homogeneous, the temperature was lowered to room temperature, and hexane was added so that the total volume became 500 ml. After stirring the solution for 10 minutes, 7.8 ml of ethanol and 5.3 ml of methanol were added and stirred for about an hour.

75 ml of $TiCl_4$ were slowly added to the solution containing ethanol and methanol over 3 hours while maintaining the temperature at 35° C. After fully adding the $TiCl_4$, the solution was additionally stirred for an hour and the formed solid constituents were precipitated. After removing the upper layer solution and adding 600 ml of hexane so that the mole ratio of titanium constituents of the precipitated solids to titanium constituents in the solution were adjusted to 1:1.5, the mixture was stirred for 2 hours at 80° C. Solid constituents were then filtered and washed several times with a large amount of hexane until titanium tetrachloride was no longer detected. After drying these solids, the resulting catalyst composition comprised 3.5 wt % of titanium, 56.2 wt % of chloride, and 16.3 wt % of magnesium.

(Polymerization)

After putting 1 l of refined hexane into a 2 l stainless steel autoclave sufficiently substituted with nitrogen, setting the temperature at 80° C., and putting 4 mmol of triethylaluminum into it, 0.02 mmol of solid catalyst constituents based on a titanium atom prepared in the above-mentioned process were added. After adding hydrogen so that a pressure inside a reactor become 45 psi, the polymerization was carried out by adding ethylene for 2 hours while maintaining the reactor pressure at 128 psi. After the polymerization, the slurry type polymerized materials were filtered producing 187 g of powder-type polymers. The melt index of this polymer was 3.10 (5 kg/10 min), the bulk density was 0.35, and the average particle size was 366 μm. These results are represented in Table 4.

Example 4

(Catalyst Preparation)

21.8 g of anhydride magnesium dichloride, 112.5 ml of 2-ethylhexylalcohol, and 300 ml of hexane were put into an anti-pressure glass reactor substituted with a sufficient amount of nitrogen and stirred at 120° C. for 3 hours. When magnesium compounds were fully dissolved so the solution became homogeneous, the temperature was lowered to room temperature and hexane was added so that the total volume became 500 ml. After stirring the solution for about 10 minutes, 13.5 ml of ethanol and 9.3 ml of methanol were added and stirred for about an hour.

131 ml of $TiCl_4$ were slowly added to the solution containing ethanol and methanol over 3 hours while maintaining the temperature at 35° C. After fully adding $TiCl_4$, the solution was stirred for an additional hour and the formed solid constituents were precipitated. After removing the upper layer solution and adding 600 ml of hexane so that the mole ratio of titanium constituents of the precipitated solids to titanium constituents in the solution were adjusted to 1:1.5, the mixture was stirred at 80° C. for 2 hours. Solid constituents were then filtered and washed several times with a large amount of hexane until titanium tetrachloride was no longer detected. After drying these solids, the resulting catalyst composition comprised 3.2 wt % of titanium, 56.2 wt % of chlorine, and 16.5 wt % of magnesium.

(Polymerization)

Ethylene was polymerized in the same process as the polymerization process in EXAMPLE 3 except that the above-prepared catalysts were used, and the polymerization results are represented in Table 4.

Comparative Example 3

(Catalyst Preparation)

21.8 g of anhydride magnesium dichloride, 112.5 ml of 2-ethylhexylalcohol, and 100 ml of hexane were put into an anti-pressure glass reactor substituted with a sufficient amount of nitrogen, and stirred at 120° C. for 3 hours. When magnesium compounds were fully dissolved so the solution became homogeneous, the temperature was lowered to room temperature. 75 ml of $TiCl_4$ and 400 ml of hexane were put into another anti-pressure glass reactor, stirred, and the above formed magnesium homogeneous solution was slowly added to it over 3 hours. After fully adding the magnesium homogeneous solution, it was stirred for an additional hour. The mixture was then stirred for 2 hours at 80° C., at which point solid constituents were filtered and washed several times with a large amount of hexane until titanium tetrachloride was no longer detected. After drying, the resulting solid catalyst composition comprised 4.7 wt % of titanium, 61.1 wt % of chlorine, and 18.3 wt % of magnesium.

(Polymerization)

Ethylene was polymerized in the same process as the polymerization process in EXAMPLE 3 except that the above-prepared catalysts were used, and the polymerization results are represented in Table 4.

Comparative Example 4

(Catalyst Preparation)

21.8 g of anhydride magnesium dichloride, 112.5 ml of 2-ethylhexylalcohol, and 300 ml of hexane were put into an anti-pressure glass reactor substituted with a sufficient amount of nitrogen, and stirred at 120° C. for 3 hours. When magnesium compounds were fully dissolved so the solution became homogeneous, the temperature was lowered to room temperature and hexane was added so that the total volume became 500 ml.

131 ml of $TiCl_4$ were slowly added to the solution over 3 hours while maintaining the temperature at 25° C. After fully adding the $TiCl_4$, the solution was stirred for an additional hour and the formed solid constituents were precipitated. After removing the upper layer solution and adding 600 ml of hexane so that the mole ratio of titanium constituents in the precipitated solids to titanium constituents in the solution were adjusted to 1:1.5, the mixture was stirred at 80° C. for 2 hours. Solid constituents were then filtered and washed several times with a large amount of hexane until titanium tetrachloride was no longer detected. After drying, the resulting solid catalyst composition comprised 2.7 wt % of titanium, 68.9 wt % of chlorine, and 22.0 wt % of magnesium.

(Polymerization)

Ethylene was polymerized in the same process as the polymerization process in EXAMPLE 3 except that the above-prepared catalysts were used, and the polymerization results are represented in Table 4.

Comparative Example 5

(Catalyst Preparation)

Polymerization catalysts were prepared in the same process as the catalysts preparation of COMPARATIVE EXAMPLE 4 except that the temperature of a homogeneous solution was maintained at 35° C. As a result of catalyst constituent analysis, the resulting catalyst composition was found to comprise 3.1 wt % of titanium, 61.8 wt % of chlorine, and 20.4 wt % of magnesium.

(Polymerization)

Ethylene was polymerized in the same process as the polymerization process in EXAMPLE 3 except that the above-prepared catalysts were used, and the polymerization results are represented in Table 4.

TABLE 4

| Classification | EXAMPLE 3 | EXAMPLE 4 | COM. EXAMPLE 3 | COM. EXAMPLE 4 | COM. EXAMPLE 5 |
|---|---|---|---|---|---|
| Product amount (g) | 187 | 170 | 121 | 225 | 208 |
| Melt Index (5 kg/10 min) | 3.10 | 1.92 | 3.65 | 20.1 | 12.0 |
| Melt Flow Ratio (21.6 kg/2.16 kg) | 33.2 | 33.5 | 33.8 | 30.5 | 30.0 |
| Bulk density (g/ml) | 0.35 | 0.32 | 0.21 | 0.35 | 0.34 |
| Activities (kg-PE/mmol-Ti) | 9.4 | 8.5 | 6.1 | 11.3 | 10.4 |
| Polymer Particle sizes | | | | | |
| Average particle sizes (ml) | 366 | 153 | 97.2 | 183 | 168 |
| Particles sizes than 105 ml (%) | 2.0 | 16.6 | 54.3 | 16.9 | 13.9 |
| >841 ml (%) | 0.8 | 0 | 0 | 0 | 0 |
| 841~500 ml (%) | 25.3 | 0 | 0 | 0 | 0 |
| 500~250 ml (%) | 50.0 | 6.5 | 7.1 | 24.1 | 12.4 |
| 250~177 ml (%) | 14.3 | 26.3 | 12.1 | 28.6 | 31.6 |
| 177~105 ml (%) | 7.5 | 50.6 | 26.5 | 30.4 | 42.1 |
| 105~44 ml (%) | 1.8 | 16.2 | 37.9 | 14.4 | 12.7 |
| <44 ml (%) | 0.2 | 0.5 | 16.5 | 2.5 | 1.2 |

Example 5

(Catalyst Preparation)

Polymerization catalysts were prepared in the same process as the catalysts preparation of EXAMPLE 3 except that the temperature of a mixed solution to which ethanol and methanol were added was maintained at 25° C. As a result of catalyst constituent analysis, the resulting catalyst composition was found to comprise 2.9 wt % of titanium, 55.6 wt % of chlorine, and 16.9 wt % of magnesium.

(Polymerization)

Ethylene was polymerized in the same process as the polymerization process in EXAMPLE 3 except that the above-prepared catalysts were used, and the polymerization results are represented in Table 5.

Example 6
(Catalyst Preparation)

17.0 9 of anhydride magnesium dichloride, 87.7 ml of 2-ethylhexylalcohol, and 300 ml of hexane were put into an anti-pressure glass reactor substituted with a sufficient amount of nitrogen and stirred at 120° C. for 3 hours. When magnesium compounds were fully dissolved so that the solution became homogeneous, the temperature was lowered to room temperature and hexane was added so that the total volume became 500 ml. After stirring the solution for about 10 minutes, 10.6 ml of ethanol and 7.2 ml of methanol were added and stirred for about an hour.

102 ml of $TiCl_4$ were slowly added to the solution containing ethanol and methanol over 3 hours while maintaining the temperature at 25° C. After fully adding the $TiCl_4$, the solution was stirred for an additional hour and the formed solid constituents were precipitated. After removing the upper layer solution and adding 600 ml of hexane so that the mole ratio of titanium constituents in the precipitated solids to titanium constituents in the solution were adjusted to 1:1.5, the mixture was stirred at 80° C. for 2 hours. Solid constituents were then filtered and washed several times with a large amount of hexane until titanium tetrachloride was no longer detected. After drying, the resulting solid catalyst composition comprised 3.3 wt % of titanium, 55.5 wt % of chlorine, and 16.8 wt % of magnesium.

(Polymerization)

Ethylene was polymerized in the same process as the polymerization process in EXAMPLE 3 except that the above-prepared catalysts were used, and the polymerization results are represented in Table 5.

Example 7
(Catalyst Preparation)

18.4 g of anhydride magnesium dichloride, 94.9 ml of 2-ethylhexylalcohol, and 300 ml of hexane were put into an anti-pressure glass reactor substituted with a sufficient amount of nitrogen, and stirred at 120° C. for 3 hours. When magnesium compounds were fully dissolved so that the solution became homogeneous, the temperature was lowered to room temperature and hexane was added so that total volume become 500 ml. After stirring the solution for about 10 minutes, 11.4 ml of ethanol and 7.8 ml of methanol were added and stirred for about an hour.

110 ml of $TiCl_4$ were slowly added to the solution containing ethanol and methanol over 3 hours while maintaining the temperature at 25° C. After fully adding the $TiCl_4$, the solution was stirred for an additional hour and the formed solid constituents were precipitated. After removing the upper layer solution and adding 600 ml of hexane so that the mole ratios of titanium constituents in the precipitated solids to titanium constituents in the solution were adjusted to 1:1.5, the mixture was stirred at 80° C. for 2 hours. Solid constituents were then filtered and washed several times with a large amount of hexane until titanium tetrachloride was no longer detected. After drying, the resulting solid catalyst composition comprised 2.9 wt % of titanium, 57.1 wt % of chlorine, and 16.6 wt % of magnesium.

(Polymerization)

Ethylene was polymerized in the same process as the polymerization process in EXAMPLE 3 except that the above-prepared catalysts were used, and the polymerization results are represented in Table 5.

Example 8
(Catalyst Preparation)

Polymerization catalysts were prepared in the same process as the catalysts preparation of EXAMPLE 4 except that the temperature of a mixed solution to which ethanol and methanol were added was maintained at 25° C. As a result of catalyst constituent analysis, it was found that the resulting catalyst composition comprised 3.2 wt % of titanium, 55.4 wt % of chlorine, and 16.2 wt % of magnesium.

(Polymerization)

Ethylene was polymerized in the same process as the polymerization process in EXAMPLE 3 except that the above-prepared catalysts were used, and the polymerization results are represented in Table 5.

Example 9
(Catalyst Preparation)

15.2 g of anhydride magnesium dichloride, 78.4 ml of 2-ethylhexylalcohol, and 300 ml of hexane were put into an anti-pressure glass reactor substituted with a sufficient amount of nitrogen and stirred at 120° C. for 3 hours. When magnesium compounds were fully dissolved so that the solution became homogeneous, the temperature was lowered to room temperature and hexane was added so that the total volume became 500 ml. After stirring the solution for about 10 minutes, 9.4 ml of ethanol and 6.5 ml of methanol were added and stirred for about an hour.

91.2 ml of $TiCl_4$ were slowly added to the solution containing ethanol and methanol over 3 hours while maintaining the temperature at 35° C. After fully adding the $TiCl_4$, the solution was additionally stirred for an hour and the formed solid constituents were precipitated. After removing the upper layer solution and adding 600 ml of hexane so that the mole ratio of titanium constituents in the precipitated solids to titanium constituents in the solution were adjusted to 1:1.5, the mixture was stirred at 80° C. for 2 hours. Solid constituents were then filtered and washed several times with a large amount of hexane until titanium tetrachloride was no longer detected. After drying, the resulting solid catalyst composition comprised 3.3 wt % of titanium, 56.9 wt % of chlorine, and 16.2 wt % of magnesium.

(Polymerization)

Ethylene was polymerized in the same process as the polymerization process in EXAMPLE 3 except that the above-prepared catalysts were used, and the polymerization results are represented in Table 5.

Example 10
(Catalyst Preparation)

Polymerization catalysts were prepared in the same process as the catalysts preparation of EXAMPLE 6 except that the temperature of a mixed solution to which ethanol and methanol were added was maintained at 35° C. As a result of catalyst constituent analysis, it was found that the catalyst composition comprised 3.7 wt % of titanium, 56.3 wt % of chlorine, and 16.9 wt % of magnesium.

(Polymerization)

Ethylene was polymerized in the same process as the polymerization process in EXAMPLE 3 except that the above-prepared catalysts were used, and the polymerization results are represented in Table 5.

Example 11
(Catalyst Preparation)

Polymerization catalysts were prepared in the same process as the catalysts preparation of EXAMPLE 7 except that the temperature of a mixed solution to which ethanol and methanol were added was maintained at 35° C. As a result of catalyst constituent analysis, it was found that the catalyst composition comprised 2.7 wt % of titanium, 57.7 wt % of chlorine, and 18.3 wt % of magnesium.
(Polymerization)

Ethylene was polymerized in the same process as the polymerization process in EXAMPLE 3 except that the above-prepared catalysts were used, and the polymerization results are represented in Table 5.

Example 12
(Catalyst Preparation)

17.0 g of anhydride magnesium dichloride, 87.7 ml of 2-ethylhexylalcohol, and 300 ml of hexane were put into an anti-pressure glass reactor substituted with a sufficient amount of nitrogen and stirred at 120° C. for 3 hours. When the magnesium compounds were fully dissolved so that the solution became homogeneous, the temperature was lowered to room temperature and hexane was added so that the total volume became 500 ml. After stirring the solution for about 10 minutes, 10.6 ml of ethanol, 3.6 ml of methanol, and 8.2 ml of n-butanol were added and stirred for about an hour.

102 ml of $TiCl_4$ were slowly added to the solution containing ethanol, methanol, and butanol over 3 hours while maintaining the temperature at 25° C. After completely adding the $TiCl_4$ and stirring the mixture for an additional hour, the formed solid constituents were filtered and washed with a large amount of refined hexane until titanium tetrachloride was no longer detected. After adding 600 ml of hexane and 34 ml of $TiCl_4$, and stirring the mixture at a temperature of 65° C. for 2 hours, the solid constituents were filtered and washed several times with a large amount of hexane until titanium tetrachloride was once again no longer detected. After drying, the resulting solid catalyst composition comprised 7.4 wt % of titanium, 62.2 wt % of chlorine, and 15.3 wt % of magnesium.
(Polymerization)

Ethylene was polymerized in the same process as the polymerization process in EXAMPLE 3 except that the above-prepared catalysts were used, and the polymerization results are represented in Table 5.

Example 13
(Catalyst Preparation)

12.5 g of anhydride magnesium dichloride, 64.5 ml of 2-ethylhexylalcohol, and 300 ml of hexane were put into an anti-pressure glass reactor substituted with a sufficient amount of nitrogen and stirred at 120° C. for 3 hours. When the magnesium compounds were fully dissolved so that the solution became homogeneous, the temperature was lowered to room temperature and hexane was added so that the total volume become 500 ml. After stirring the solution for about 10 minutes, 7.8 ml of ethanol and 5.3 ml of methanol were added and stirred for about an hour.

75 ml of $TiCl_4$ were slowly added to the solution containing ethanol and methanol over 3 hours while maintaining the temperature at 25° C. After fully adding the $TiCl_4$, stirring for an additional hour, then stirring the mixture at a temperature of 80° C. for 2 hours, the solid constituents were filtered and washed several times with a large amount of hexane until titanium tetrachloride was no longer detected. After drying, the resulting solid catalyst composition comprised 3.2 wt % of titanium, 57.4 wt % of chlorine, and 17.0 wt % of magnesium.
(Polymerization)

Ethylene was polymerized in the same process as the polymerization process in EXAMPLE 3 except that the above-prepared catalysts were used, and the polymerization results are represented in Table 5.

Example 14
(Catalyst Preparation)

12.5 g of anhydride magnesium dichloride, 64.5 ml of 2-ethylhexylalcohol, and 300 ml of hexane were put into an anti-pressure glass reactor substituted with a sufficient amount of nitrogen and stirred at 120° C. for 3 hours. When the magnesium compounds were fully dissolved so that the solution became homogeneous, the temperature was lowered to room temperature and hexane was added so that the total volume become 500 ml. After stirring the solution for about 10 minutes, 7.8 ml of ethanol and 5.3 ml of methanol were added and stirred for about an hour.

50 ml of $TiCl_4$ were slowly added to the solution containing ethanol and methanol over 3 hours while maintaining the temperature at 25° C. After fully adding the $TiCl_4$ and stirring the solution for an additional hour, the solid constituents were filtered and washed several times with a large amount of hexane until titanium tetrachloride was no longer detected. After adding 25 ml of $TiCl_4$ over an hour while stirring then stirring the mixture at a temperature of 80° C. for two hours, the solid constituents were filtered and washed several times with a large amount of hexane until titanium tetrachloride was no longer detected. After drying, the resulting solid catalyst composition comprised 5.4 wt % of titanium, 58.5 wt % of chlorine, and 16.5 wt % of magnesium.
(Polymerization)

Ethylene was polymerized in the same process as the polymerization process in EXAMPLE 3 except that the above-prepared catalysts were used, and the polymerization results are represented in Table 5.

TABLE 5

| Classification | | EX. 5 | EX. 6 | EX. 7 | EX. 8 | EX. 9 | EX. 10 | EX. 11 | EX. 12 | EX. 13 | EX. 14 |
|---|---|---|---|---|---|---|---|---|---|---|---|
| Product amount (g) | | 206 | 177 | 172 | 213 | 185 | 174 | 178 | 227 | 189 | 243 |
| Melt Index (5 kg/10 min) | | 4.43 | 2.01 | 3.46 | 4.97 | 3.92 | 2.66 | 2.42 | 8.86 | 4.10 | 5.40 |
| Melt Flow Rate (21.6 kg/2.16 kg) | | 33.6 | 33.3 | 33.1 | 33.4 | 33.7 | 34.2 | 32.7 | 34.7 | 33.6 | 33.8 |
| Bulk density (g/ml) | | 0.34 | 0.35 | 0.34 | 0.33 | 0.35 | 0.34 | 0.33 | 0.34 | 0.33 | 0.34 |
| Activities (kg-PE/mmol-Ti) | | 10.3 | 8.9 | 8.6 | 10.7 | 9.3 | 8.7 | 8.9 | 11.4 | 9.5 | 12.2 |
| Polymer Particle sizes | Average particle sizes (ml) | 336 | 170 | 148 | 97 | 244 | 222 | 209 | 205 | 359 | 265 |
| | Particles less than 105 ml (%) | 2.6 | 13.1 | 17.8 | 57.6 | 5.7 | 5.2 | 5.4 | 6.1 | 2.7 | 5.5 |
| | >841 ml (%) | 0.3 | 0 | 0 | 0 | 0 | 0 | 0 | 0 | 0.5 | 0 |
| | 841~500 ml (%) | 18.6 | 0 | 0 | 0 | 1.5 | 0.1 | 0 | 0 | 23.6 | 3.5 |

TABLE 5-continued

| Classification | EX. 5 | EX. 6 | EX. 7 | EX. 8 | EX. 9 | EX. 10 | EX. 11 | EX. 12 | EX. 13 | EX. 14 |
|---|---|---|---|---|---|---|---|---|---|---|
| 500~250 ml (%) | 52.3 | 10.7 | 3.92 | 0.4 | 46.3 | 37.1 | 28.6 | 27.0 | 49.7 | 51.4 |
| 250~177 ml (%) | 16.6 | 35.1 | 25.9 | 6.9 | 28.0 | 34.1 | 39.6 | 39.2 | 14.8 | 24.2 |
| 177~105 ml (%) | 9.5 | 41.1 | 52.4 | 35.1 | 18.7 | 23.6 | 26.4 | 27.7 | 8.8 | 15.5 |
| 105~44 ml (%) | 2.3 | 12.6 | 17.3 | 55.2 | 5.2 | 5.0 | 5.1 | 5.7 | 2.1 | 5.0 |
| <44 ml (%) | 0.3 | 0.5 | 0.5 | 2.4 | 0.5 | 0.2 | 0.3 | 0.4 | 0.5 | 0.5 |

Polyolefin polymerization catalysts of the present invention have superior activities, they prepare polymers having high Melt Flow Ratios, and produce lesser amounts of polymers having fine particles.

Furthermore, polymers of solid catalysts that are prepared even by contacting quadrivalence titanium hydride with a homogeneous solution of magnesium compounds at a relatively high temperature over room temperature (25° C.) are very uniform in particle distributions, they provide ease in controlling catalyst particle sizes during catalyst preparation so polymers having various particle distributions can be prepared, they can prepare polymers having a lesser amount of undesirable fine particles as well as polymers in which catalyst activities and specific gravities are very high and Melt Flow Ratios are high during polyolefin polymerization.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A process for preparing polyolefin polymerization catalysts comprising the steps of:
   a) preparing a homogeneous magnesium solution by heating:
      i) magnesium compounds;
      ii) alcohols having 6 or more carbon atoms; and
      iii) hydrocarbon solvents having 6 or more carbon atoms;
   b) preparing magnesium precipitates by sequentially adding two or more alcohols having 5 or less carbon atoms to the homogeneous solution prepared in step a);
   c) adding primary organic aluminum compounds or alkylmagnesium halides to magnesium precipitates prepared in step b);
   d) adding titanium compounds to magnesium precipitates that passed through step c);
   e) adding secondary organic aluminum compounds or electron donors to the magnesium precipitates that passed through step d); and
   f) filtering, washing, and drying the magnesium precipitate solution that passed through step e).

2. A process for preparing polyolefin polymerization catalysts in accordance with claim 1, wherein the magnesium compounds of step a) are one or more compounds selected from a group consisting of magnesium halides, alkoxy magnesium halides, alkoxymagnesiums, aryloxymagnesiums, and magnesium carbonates.

3. A process for preparing polyolefin polymerization catalysts in accordance with claim 1 wherein the alcohols of step b) are selected from the group consisting of methanol, ethanol, n-propanol, isopropanol, n-butanol, and tertiary butanol, or a mixture thereof.

4. A process for preparing polyolefin polymerization catalysts in accordance with claim 1, wherein the primary organic aluminum compounds of step c) are compounds represented as in the following Chemical Formula 1 or Chemical Formula 2:

$$R^1_m Al(OR^2)_n H_p X_q \quad \text{[Chemical Formula 1]}$$

where $R^1$ and $R^2$, each of which can be the same or different, are hydrocarbon groups having 1 to 10 carbon atoms, X is a halogen atom, $0 < m \leq 3$, $0 \leq n < 3$, $0 \leq p < 3$, $0 \leq q < 3$, and $m+n+p+q=3$;

$$M^1 AlR^1_4 \quad \text{[Chemical Formula 2]}$$

where $M^1$ is Li, Na, or K, and $R^1$ is a hydrocarbon group having 1 to 10 carbon atoms.

5. A process for preparing polyolefin polymerization catalysts in accordance with claim 1, wherein the magnesium halides of step c) are represented as in the following Chemical Formula 3:

$$RMgX \quad \text{[Chemical Formula 3]}$$

where R is a hydrocarbon group having 1 to 10 carbon atoms, and X is a halogen atom.

6. A process for preparing polyolefin polymerization catalysts in accordance with claim 1, wherein the titanium compounds of step d) are represented as in the following Chemical Formula 4:

$$Ti(OR^1)_a (R^2)_b X_c \quad \text{[Chemical Formula 4]}$$

where $R^1$ and $R^2$ are hydrocarbon groups, X is a halogen atom, $a+b+c=4$, $a \geq 0$, $b \geq 0$, and $c \geq 0$.

7. A process for preparing polyolefin polymerization catalysts in accordance with claim 1, wherein the secondary organic aluminum compounds of step e) are represented in Chemical Formula 1 or Chemical Formula 2:

$$R^1_m Al(OR^2)_n H_p X_q \quad \text{[Chemical Formula 1]}$$

where $R^1$ and $R^2$, each of which can be the same or different, are hydrocarbon groups having 1 to 10 carbon atoms, X is a halogen atom, $0 < m \leq 3$, $0 \leq n < 3$, $0 \leq p < 3$, $0 \leq q < 3$, and $m+n+p+q=3$;

$$M^1 AlR^1_4 \quad \text{[Chemical Formula 2]}$$

where $M^1$ is Li, Na, or K, and $R^1$ is a hydrocarbon group having 1 to 10 carbon atoms.

8. A process for preparing polyolefin polymerization catalysts in accordance with claim 1, wherein the electron donors of step e) are compounds as represented in the following Chemical Formula 5 or phthalic anhydride:

$$R^1 COOR^2, R^3 OOC-C_6H_4-COOR^4 \quad \text{[Chemical Formula 5]}$$

where $R^1$ is a hydrocarbon group, $R^2$, $R^3$, and $R^4$ are hydrocarbons or hydrogen.

9. A process for preparing polyolefin polymerization catalysts in accordance with claim 2, wherein the magnesium halide is selected from the group consisting of magnesium chloride, magnesium bromide, magnesium fluoride, and magnesium iodide; the alkoxymagnesium halide is selected from the group consisting of methoxymagnesium chloride, ethoxymagnesium chloride, isopropoxymagnesium chloride, butoxymagnesium chloride, and octoxymagnesium chloride; the alkoxymagnesium is selected from the group consisting of ethoxymagnesium, n-propoxymagnesium, butoxymagnesium, and 2-ethylhexosymagnesium; the aryloxymagnesium is phenoxymagnesium; and the magnesium carbonate is selected from the group consisting of magnesium lauric acid and magnesium stearate.

10. The process for preparing polyolefin polymerization catalysts according to claim 3, wherein, in step b), methanol and ethanol are sequentially added.

11. A process for preparing titanium catalysts for polyolefin polymerization comprising the steps of:
   a) preparing a homogeneous magnesium solution by agitating:
      i) magnesium compounds;
      ii) alcohols having 6 or more carbon atoms; and
      iii) hydrocarbon solvents;
   b) preparing a mixture by adding two or more alcohols having 5 or less carbon atoms to the homogeneous solution prepared in step a); and
   c) contacting the mixture prepared in step b) with titanium halide compounds.

12. A process for preparing titanium catalysts for polyolefin polymerization in accordance with claim 11, wherein an input amount of alcohols having 6 or more carbon atoms of ii) per one mole of magnesium compounds of i) of step a) is from 0.5 to 10 moles, and an input amount of hydrocarbon solvents of iii) is 15 or more moles.

13. A process for preparing titanium catalysts for polyolefin polymerization in accordance with claim 11, wherein a magnesium concentration of the homogeneous solution prepared in step a) is from 5 to 10 g/l.

14. A process for preparing titanium catalysts for polyolefin polymerization in accordance with claim 11, wherein an added amount of alcohols having 5 or less carbon atoms of step b) is 0.5 to 6 moles per one mole of magnesium compound.

15. A process for preparing titanium catalysts for polyolefin polymerization in accordance with claim 11, wherein a contact temperature of a mixture of step c) and titanium halide compounds is from −50 to 100° C.

16. A process for preparing titanium catalysts for polyolefin polymerization in accordance with claim 11, wherein the magnesium compounds of i) of step a) are one or more compounds selected from the group consisting of magnesium halides, alkoxymagnesium halides, aryloxymagnesium halides, alkoxymagnesiums, and magnesium carbonate.

17. A process for preparing titanium catalysts for polyolefin polymerization in accordance with claim 11, wherein the alcohols having 6 or more carbon atoms of ii) of step a) are one or more alcohols selected from the group consisting of aliphatic alcohols, arylcyclic alcohols, and aromatic alcohols.

18. A process for preparing titanium catalysts for polyolefin polymerization in accordance with claim 11, wherein the hydrocarbon solvents of iii) of step a) are selected from the group consisting of aliphatic hydrocarbons, arylcyclic hydrocarbons, aromatic hydrocarbons, and hydrocarbon halides.

19. A process for preparing titanium catalysts for polyolefin polymerization in accordance with claim 11, wherein the alcohols having 5 or less carbon atoms of step b) selected from the group consisting of methanol, ethanol, isopropanol, n-butanol, tert-butanol, and n-pentanol.

20. A process for preparing titanium catalysts for polyolefin polymerization in accordance with claim 11, wherein the titanium halide compounds of step c) are selected from the group consisting of titanium tetrahalides, alkoxytitanium trihalides, alkoxytitanium dihalides, and alkoxytritanium halides.

21. A process for preparing titanium catalysts for polyolefin polymerization in accordance with claim 11 comprising the steps of:
   a) preparing a magnesium chloride homogeneous solution by adding 2-ethylhexylalcohol and hexane to magnesium chloride, agitating and dissolving at a temperature of 100 to 150° C.;
   b) preparing a mixture by adding ethanol and methanol to the magnesium chloride homogeneous solution of step a); and
   c) contacting the mixture of step b) with titanium tetrachloride at a temperature of 10 to 50° C.

22. A solid titanium catalyst for polyolefin polymerization prepared according to the preparation process of claim 11.

23. A process for preparing polyolefin polymerization catalysts in accordance with claim 16, wherein the magnesium halide is selected from the group consisting of magnesium chloride, magnesium bromide, magnesium fluoride, and magnesium iodide; the alkoxymagnesium halide is selected from the group consisting of methoxymagnesium chloride, ethoxymagnesium chloride, isopropoxymagnesium chloride, butoxymagnesium chloride, and octoxymagnesium chloride; the alkoxymagnesium is selected from the group consisting of ethoxymagnesium, n-propoxymagnesium, butoxymagnesium, and 2-ethylhexosymagnesium; the aryloxymagnesium halide is phenoxymagnesium chloride; and the magnesium carbonate is selected from the group consisting of magnesium lauric acid and magnesium stearate.

24. A process for preparing titanium catalysts for polyolefin polymerization in accordance with claim 17, wherein the aliphatic alcohol is selected from the group consisting of n-hexanol, n-heptanol, n-octanol, decanol, dodecanol, 2-methylpentanol, 2-ethylbutanol, and 2-ethylhexanol; the arylcyclic alcohol is selected from the group consisting of cyclohexanol and methylcyclohexanol; and the aromatic alcohol is selected from the group consisting of benzyl alcohol, methylbenzyl alcohol, isopropylbenzyl alcohol, and α-methylbenzyl alcohol.

25. A process for preparing titanium catalysts for polyolefin polymerization in accordance with claim 18, wherein the aliphatic hydrocarbon is selected from the group consisting of pentane, hexane, heptane, octane, decane, dodecane, tetradecane, and kerosene; the arylcyclic hydrocarbon is selected from the group consisting of cyclicpentane, cyclichexane, cyclicoctane, methylcyclicpentane, and methylcyclic hexane; the aromatic hydrocarbon is selected from the group consisting of benzene, toluene, xylene, ethylbenzene, and cumene; and the hydrocarbon halide is selected from the group consisting of dichloroethane, dichloropentane, trichloroethane, carbon tetrachloride, and chlorobenzene.

26. A process for preparing titanium catalysts for polyolefin polymerization in accordance with claim 20, wherein the titanium tetrahalide is selected from the group consisting of $TiCl_4$, $TiBr_4$, and $TiI_4$; the alkoxytitanium trihalide is selected from the group consisting of $Ti(OCH_3)Cl_3$, Ti(OC$_2$H$_5$)Cl$_3$, and Ti(OC$_2$H$_5$)Br$_3$; the alkoxytitanium dihalide is selected from the group consisting of Ti(OCH$_3$)$_2$Cl$_2$, Ti(OC$_2$H$_5$)$_2$Cl$_2$, and Ti(OC$_2$H$_5$)$_2$Br$_2$; and the alkoxytrititanium halide is selected from the group consisting of Ti(OCH$_3$)$_3$Cl, Ti(OC$_2$H$_5$)$_3$Cl, and Ti(OC$_2$H$_5$)$_3$Br.

27. The process for preparing titanium catalysts for polyolefin polymerization according to claim 19, wherein, in step b), methanol and ethanol are sequentially added.

* * * * *